(12) United States Patent
Lee et al.

(10) Patent No.: US 7,988,750 B2
(45) Date of Patent: Aug. 2, 2011

(54) METHOD FOR RECOVERING METHANE GAS FROM NATURAL GAS HYDRATE

(75) Inventors: Huen Lee, Taejon (KR); Do-Youn Kim, Gyeonggi-do (KR); Young-June Park, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 1009 days.

(21) Appl. No.: 11/668,143

(22) Filed: Jan. 29, 2007

(65) Prior Publication Data

US 2008/0022594 A1 Jan. 31, 2008

(30) Foreign Application Priority Data

Jul. 31, 2006 (KR) .................. 10-2006-0071835

(51) Int. Cl.
*C01B 3/32* (2006.01)
*C10J 3/46* (2006.01)
(52) U.S. Cl. ............... 48/127.3; 48/197 R; 48/127.5; 585/15; 532/56
(58) Field of Classification Search ............ 48/127.3
See application file for complete search history.

(56) References Cited

U.S. PATENT DOCUMENTS

| | | | |
|---|---|---|---|
| 4,440,634 A * | 4/1984 | Mitchell ............ | 208/310 R |
| 2001/0052288 A1 * | 12/2001 | Lee et al. ............ | 95/173 |
| 2006/0060356 A1 * | 3/2006 | Graue et al. ............ | 166/305.1 |

OTHER PUBLICATIONS

Gunn et al., "Towards Improved Ground Models for Slope Instability . . . " Terra Nova 14:443-450, 2002.
Kvenvolden K., "A Review of the Geochemistry of Methane in Natural Gas Hydrate" Org. Geochem. 11/12:997-1008, 1995.
Lee et al., "Methane Hydrates Potential as a Future Energy Source" Fuel Processing Technology 71:181-186, 2001.
Lee et al., "Recovering Methane from Solid Methane Hydrate with Carbon Dioxide" Angew. Chem. Int. Ed. 42:5048-5051, 2003.
Lelieveld et al., "Indirect Chemical Effects of Methane on Climate Warming" Letter to Nature 355:339-342, 1992.
Milkov et al., "Economic Geology of Offshore Gas Hydrate Accumulations and Provinces" Marine and Petroleum Geology 19:1-11, 2002.
Sloan E., "Fundamental Principles and Applications of Natural Gas Hydrates" Nature 426:353-359, 2003.

* cited by examiner

*Primary Examiner* — Kaity V. Handal
(74) *Attorney, Agent, or Firm* — Fish & Richardson P.C.

(57) ABSTRACT

The present invention relates to a method for recovering methane gas by adding a gas mixture containing $N_2$ and $CO_2$ gases to natural gas hydrate and reacting them. The method for recovering methane gas from natural gas hydrate of the present invention comprises the step of replacing $CH_4$ gas in natural gas hydrate with a gas mixture containing $N_2$ and $CO_2$ gases by adding the gas mixture to the natural gas hydrate. The method for recovering methane gas of the invention assures a recovery rate of $CH_4$ gas much higher than prior art method without dissociating natural gas hydrate layer and utilization of flue gas as a gas mixture containing $N_2$ and $CO_2$ gases, which makes possible its practical application for the production of natural gas in terms of economy and environmental protection.

4 Claims, 2 Drawing Sheets

METHOD FOR RECOVERING METHANE GAS FROM NATURAL GAS HYDRATE

RELATED APPLICATION INFORMATION

This application claims priority under 35 U.S.C. §119(b) to Korean Application Serial No. 10-2006-0071835, filed Jul. 31, 2006.

FIELD OF THE INVENTION

The present invention relates to a method for recovering methane gas from natural gas hydrate, more specifically, to a method for recovering $CH_4$ gas by adding a gas mixture containing $N_2$ and $CO_2$ gases to natural gas hydrate and reacting them.

BACKGROUND OF THE INVENTION

Natural gas is eco-friendly energy source playing an important role in the energy system which has been maintained without environmental disruption. Natural gas exists as natural gas hydrate in nature, which is a crystalline clathrate hydrate containing hydrocarbons such as a major component of methane, and trace amounts of ethane, propane and butane. Natural gas hydrate deposited worldwide is being noted as an alternative energy source to fossil fuel in the future, since natural gas in a form of natural gas hydrate has been reported to be stored in an amount of about $0.2 \times 10^{15}$ to $7,600 \times 10^{15}$ m$^3$, which is an amount to supply most energy consumed in the world (see: Sloan, Jr. E. D., et al., Nature, 426:353-359, 1998; Lee, S. Y., Holder, G. D., Fuel Processing Technology, 71:181-186, 2001).

To maximize the utilization of such valuable natural gas hydrate as an energy source in real life, methods for dissociating $CH_4$ from the natural gas hydrate should be explored, and several approaches have been made in the art as follows: thermal stimulation which dissociates methane from the natural gas hydrate by injecting water of high temperature to hydrate layer through a pipe; depressurization which dissociates methane from the natural gas hydrate by depressurizing natural gas hydrate layer using a vacuum device; and, injection of inhibitors which dissociate methane from natural gas hydrate by interfering the condition that natural gas hydrate exists in a stable form to change the equilibrium toward higher temperature and lower pressure (see: Gunn, D. A., et al., Terra Nova, 14:443-450, 2002).

However, in case of using the said prior methods, $CH_4$ gas as a major component of natural gas hydrate is dissociated and released directly so that natural gas hydrate layers are disrupted, to give rise to geological problems such as a ground subsidence and environmental problems such as considerable changes in the ecosystem (see: Lelieveld, J., et al., Nature, 355:339-342, 1992).

SUMMARY OF THE INVENTION

The present inventors have made an effort to develop a method for recovering $CH_4$ gas from natural gas hydrate without dissociating the natural gas hydrate layer, and discovered that $CH_4$ gas can be recovered efficiently by adding a gas mixture containing $N_2$ and $CO_2$ gases to natural gas hydrate under a high pressure to replace $CH_4$ gas in natural gas hydrate with the gas mixture by the difference in the partial pressures of $CH_4$ gas in the natural gas hydrate and the gas mixture.

A primary object of the present invention is, therefore, to provide a method for recovering methane gas by adding a gas mixture containing $N_2$ and $CO_2$ gases to natural gas hydrate to replace $CH_4$ gas in natural gas hydrate with the gas mixture.

BRIEF DESCRIPTION OF THE DRAWINGS

The above and the other objects and features of the present invention will become apparent from the following descriptions given in conjunction with the accompanying drawings, in which.

DETAILED DESCRIPTION OF THE INVENTION

Methane($CH_4$) gas forms methane gas hydrate having a cubic structure (Pm3n, $8CH_4 \cdot 46H_2O$) when reacting with water at 0° C. under a pressure of about 30 atm, which occupies most of the natural gas hydrate layers(see: Kvenvolden, K. A., Chem. Geol., 71:41, 1998). The present inventors have made various efforts to develop a method for recovering methane gas from natural gas hydrate efficiently without dissociating the natural gas hydrate layer, while focusing on the availability of $CO_2$ gas.

Methane gas hydrate is formed by reacting $CH_4$ gas with water at 0° C. under a pressure of over 25 atm, whereas $CO_2$ gas hydrate is formed by reacting $CO_2$ gas with water at 0° C. under a pressure of over 12 atm. In this connection, it has been reported that carbon dioxide hydrate exists stably under a condition that methane gas hydrate exists in a stable form, while methane gas hydrate cannot exist stably under a condition that carbon dioxide hydrate exists in a stable form(see: Sloan, Jr. E. D., Clathrate Hydrates of Natural Gases, 2$^{nd}$ ed., Marcel Dekker, New York, 1998). The present inventors carried out a series of experiments under an assumption that most of $CH_4$ gas can be recovered by adding $CO_2$ gas to natural gas hydrate under a condition that forms carbon dioxide hydrate, to replace $CH_4$ gas in the natural gas hydrate with a gas mixture without dissociating the natural gas hydrate layer, by the difference in the partial pressures of $CH_4$ gas in the natural gas hydrate and the gas mixture, and succeeded in recovering $CH_4$ gas with a recovery rate of 64% (see: Lee Heun, et al., Angew. Chem. Int. Ed., 42:5048-5051, 2003).

However, the recovery rate was considered not reach to the theoretically expected one, therefore, the present inventors further performed experiments to elucidate the cause of the said difference, and found that the said cause was uneven distribution of $CH_4$ gas in the natural gas hydrate in small cage or large cage. That is, though there is no difference in molecular size of added $CO_2$ gas, $CH_4$ gas whose molecular size is smaller than $CO_2$ gas, can be readily replaced with $CO_2$ gas in the large cage of the natural gas hydrate, while it cannot be made in the small cage, and such a phenomenon gives a recovery rate lower than the theoretically expected one.

Figure 1:
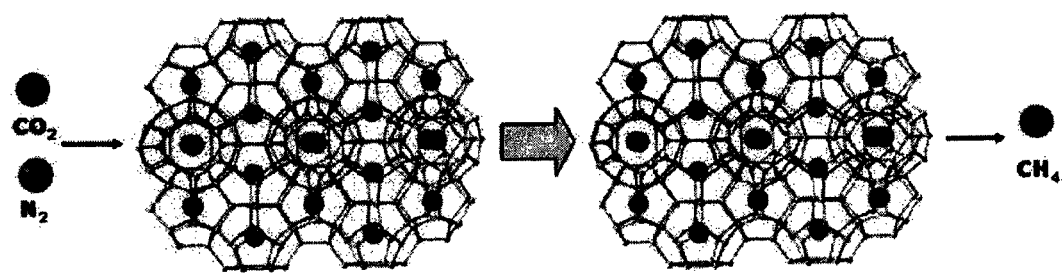
FIG. 1 is a diagram depicting the replacement of $CH_4$ gas in natural gas hydrate with a gas mixture containing $N_2$ and $CO_2$ gases by adding the gas mixtures to the natural gas hydrate.

Under the circumstances, the inventors tried to increase the recovery rate while overcoming the above-mentioned problem, made an assumption that the addition of a gas mixture containing $N_2$ and $CO_2$ gases, which can be entrapped in a small cage in a form of hydrate, to a natural gas hydrate may give the recovery rate of $CH_4$ gas higher than that of $CO_2$ gas only (see: FIG. 1). FIG. 1 is a diagram depicting the replacement of $CH_4$ gas in natural gas hydrate with a gas mixture containing $N_2$ and $CO_2$ gases by adding the gas mixture to the natural gas hydrate. Further, they made an assumption that: $N_2$ gas having a particle size smaller than $CO_2$ gas can replace $CH_4$ gas even in a cage having a size that $CO_2$ gas cannot replace, however nitrogen hydrate, due to its unstable nature, cannot be fixed in a natural gas hydrate without $CO_2$ gas; and, therefore, $N_2$ gas would be preferably used in a mixed form with $CO_2$ gas.

A series of experiments to replace $CH_4$ gas in natural gas hydrate with a gas mixture containing $N_2$ and $CO_2$ gases were carried out to convince the assumptions made above, and addition of a gas mixture containing $N_2$ and $CO_2$ gases to the natural gas hydrate, gave a recovery rate of $CH_4$ gas much higher than that of using $CO_2$ gas only. Particularly, it was demonstrated that: usage of a gas mixture containing $N_2$ and $CO_2$ gases in a molar ratio of 8:2, at the point of 9 hrs reaction, gave a recovery rate of $CH_4$ gas (64%) which is maximal in case of using $CO_2$ gas only; as the time passed over 9 hrs, it gave a recovery rate of $CH_4$ gas higher than that of control; at the time of 20 hrs reaction, it gave a maximum recovery rate(85%); and, at the point of 20 hrs reaction, the recovery rate did not increase any more. Such results were the same as the case of using gas mixtures containing $N_2$ and $CO_2$ gases in a molar ratio of 9:1 to 1:9.

Considering economical and environmental aspects of the method of present invention, a gas mixture containing $N_2$ and $CO_2$ gases may be substituted with flue gas exhausted from factories. Flue gas which contains a variety of gas components such as $CO_2$, $N_2$ gases, water and sulfur, is regarded as an example of the gas mixture containing $N_2$ and $CO_2$ gases, since the gas components other than $N_2$ and $CO_2$ gases are readily removed by using a cleanup apparatus as a means for protecting environmental pollution.

Under a consideration that the composition of flue gas is similar to that of the gas mixtures stated above and the gas mixture containing $N_2$ and $CO_2$ gases in a molar ratio of 1:9 to 9:1 can be employed in the method of present invention, the flue gas was employed as an alternative to the gas mixture in the replacement reaction, which gave a recovery rate of $CH_4$ gas ranging 71% to 83%. Usage of the flue gas, which is an industrial waste exhausted from the factories, makes possible its practical application for the production of natural gas in terms of economy and environmental protection, though it has revealed a shortcoming of unsteady recovery rate of $CH_4$ gas due to the considerable variation in the composition ratio of $N_2$ and $CO_2$ gases. Further, it provides a benefit of countering global warming, since $CO_2$ gas contained in the flue gas can be removed in the atmosphere.

As stated above, a method for recovering methane gas from natural gas hydrate of the present invention comprises the step of replacing $CH_4$ gas in natural gas hydrate with a gas mixture containing $N_2$ and $CO_2$ gases by adding the gas mixture to the natural gas hydrate. In carrying out the method, the gas mixture, but not limited thereto, contains $N_2$ and $CO_2$ gases in a molar ratio of 1:9 to 9:1, more preferably 4:6 to 9:1, most preferably 8:2, and flue gas may be used in stead of the gas mixture. Further, the gas mixture, but not limited thereto, is added to the natural gas hydrate at a temperature of 0 to 5° C. to reach a pressure of 30 to 200 atm and reacted for 9 to 20 hours. The temperature of 0 to 5° C. is a range that the natural gas hydrate exists in environmental condition, and recovery rate of $CH_4$ gas from the natural gas hydrate is decreased under a temperature of below 0° C., and replacement of $CH_4$ gas with gas mixture is not made normally under a temperature of above 5° C. since the natural gas hydrate become unstable. In addition, replacement of $CH_4$ gas with a gas mixture can be made efficiently under a pressure of 30 to 200 atm without dissociating natural gas hydrate, and recovery of $CH_4$ gas from the natural gas hydrate cannot be made since the structure of natural gas hydrate is dissociated under a pressure of below 30 atm.

The present invention is further illustrated by the following examples, which should not be taken to limit the scope of the invention.

EXAMPLE 1

Figure 2:
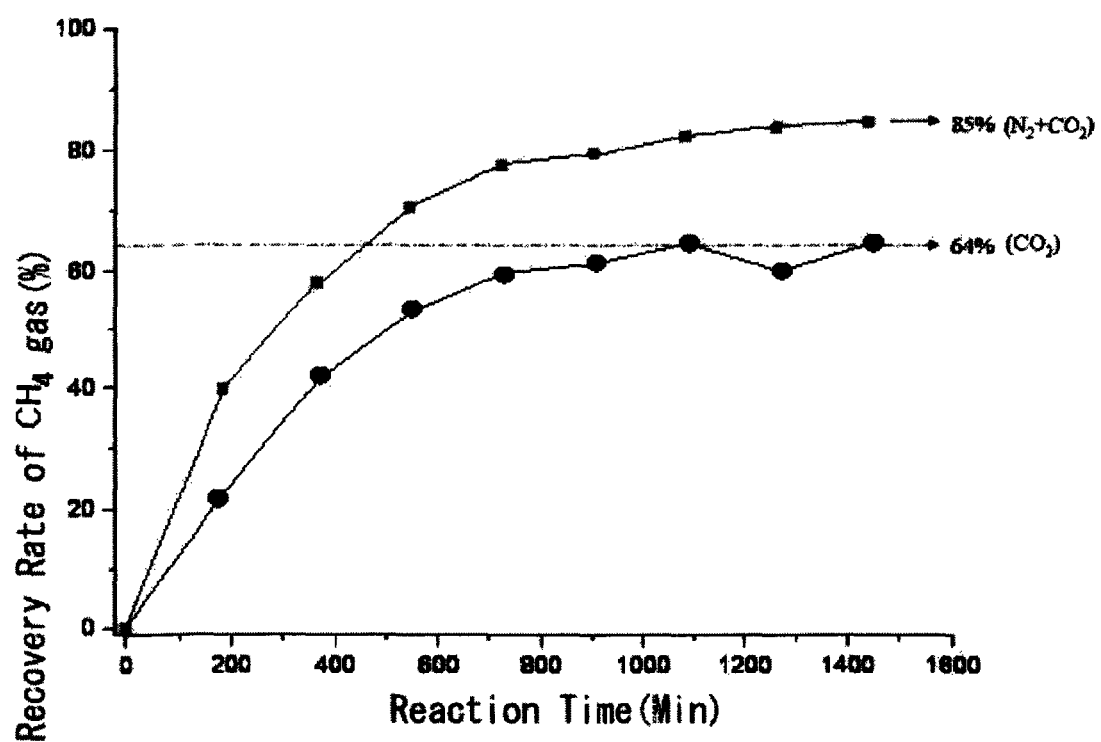
FIG. 2 is a graph showing the time course of the recovery rates of $CH_4$ gas, in case of adding a gas mixture containing $N_2$ and $CO_2$ gases(experimental group) and $CO_2$ gas only (control) to natural gas hydrate.

Recovery of $CH_4$ Gas from Natural Gas Hydrate by Addition of a Gas mixture Containing $N_2$ and $CO_2$ Gases Natural gas hydrate was subjected to a high-pressure cell for Raman analysis in accordance with the method described in publication of the inventors(see: Sloan, Jr. E. D., Clathrate Hydrates of Natural Gases, $2^{nd}$ ed., Marcel Dekker, New York, 1998). While maintaining the initial temperature of 0° C., a gas mixture containing $N_2$ and $CO_2$ gases in a molar ratio of 8:2 with the same temperature was added to the high-pressure cell to reach a pressure of 120 atm in the cell to replace $CH_4$ gas in the natural gas hydrate with the gas mixture for 23 hrs. The temperature of the high-pressure cell at the point of 23 hrs was 1.1° C. And then, the amounts of $CH_4$ gas recovered from the natural gas hydrate were measured as time goes by, and the recovery rate of $CH_4$ gas was calculated by comparing them with the amount in $CH_4$ gas contained in the natural gas hydrate, where the amount of $CH_4$ gas was measured by the aid of Raman spectrometer(RFS-100S FT-Raman Spectrometer, Bruker, USA) and $CO_2$ gas was used as a control(see: FIG. 2). FIG. 2 is a graph showing the time course of the recovery rate of $CH_4$ gas in a case that $CH_4$ gas is recovered from natural gas hydrate by using $CO_2$ gas only (control) and a gas mixture containing $N_2$ and $CO_2$ gases (experimental group), where (•) and (■) indicate control and experimental groups, respectively.

As can be seen in FIG. 2, the recovery rates of $CH_4$ gas in case of using a gas mixture containing $N_2$ and $CO_2$ gases were changed as follows: at the point of 9 hrs reaction, the recovery rate was the same as that of control; as the time passed over 9 hrs, the recovery rates were higher than those of control; and, at the point of over 20 hrs reaction, the recovery rates were not increased any more. Further, in case of using a gas mixture, the recovery rate of 85% was measured finally, which was much higher than that (64%) of using $CO_2$ gas only (control).

From the above results, it was considered that more $CH_4$ gas, in case of using a gas mixture, could be recovered from natural gas hydrate, since $CH_4$ gas entrapped in the small cage was replaced with $N_2$ gas, unlike the case of adding $CO_2$ gas only to recover $CH_4$ gas.

EXAMPLE 2

Determination of Ratio of $N_2$ and $CO_2$ gases Contained in Gas mixture

Based on the results of Example 1 that more $CH_4$ gas could be recovered from natural gas hydrate by using a gas mixture containing $N_2$ and $CO_2$ gases, the present inventors examined whether the recovery rate was changed depending on the ratio of $N_2$ and $CO_2$ gases contained in the gas mixture: Recovery rate of $CH_4$ gas was measured similarly as in Example 1, with the exceptions of using a gas mixture containing $N_2$ and $CO_2$ gases in a molar ratio of 0:10, 1:9, 2:8, 3:7, 4:6, 5:5, 6:4, 7:3, 8:2 or 9:1 and reacting for 20 hrs (see: Table 1).

TABLE 1

Changes in recovery rate depending on the ratio of
$N_2$ and $CO_2$ gases in a gas mixture

| Mixing Ratio of $N_2$ and $CO_2$ (in molar ratio) | Recovery Rate of $CH_4$ gas (%) |
|---|---|
| 0:10 | 64 |
| 1:9 | 71.2 |
| 2:8 | 74.4 |
| 3:7 | 79.6 |
| 4:6 | 82.9 |
| 5:5 | 81.1 |
| 6:4 | 78.4 |
| 7:3 | 84.2 |
| 8:2 | 85 |
| 9:1 | 83.3 |

As can be seen in Table 1 above, it was found that: as the $N_2$ gas content in a gas mixture increased, the recovery rate of $CH_4$ gas was increased and the highest recovery rate was achieved in case of using a gas mixture containing $N_2$ and $CO_2$ gases in a molar ratio of 8:2; and, the recovery rate of $CH_4$ gas was much higher than the case of using $CO_2$ gas only, even though the gas mixture contained a small amount of $N_2$ gas.

Accordingly, it was clearly demonstrated that $CH_4$ gas could be recovered by using a gas which contains $N_2$ and $CO_2$ gases in a variety of mixing ratios more efficiently than by using $CO_2$ gas only.

EXAMPLE 3

Recovery of $CH_4$ Gas by Employing Flue Gas

Based on the results of Examples 1 and 2 that gas mixtures containing $N_2$ and $CO_2$ gases could be used for the recovery of $CH_4$ gas, the inventors examined whether flue gas containing $N_2$ and $CO_2$ gases in a variety of mixing ratios could be used for the recovery of $CH_4$ gas from natural gas hydrate: Recovery rate of $CH_4$ gas was measured similarly as in Example 1, with an exception of using flue gases collected from 10 factories located at an industrial complex instead of the gas mixture (see: Table 2).

TABLE 2

Changes in recovery rate of $CH_4$ gas in case of
using a variety of flue gases containing $N_2$ and $CO_2$

| Flue Gases from | Mixing Ratio of $N_2$ and $CO_2$ (in molar ratio) | Recovery Rate of $CH_4$ gas (%) |
|---|---|---|
| Factory 1 | 6:4 | 78.1 |
| Factory 2 | 7:3 | 83.4 |
| Factory 3 | 4:6 | 81.5 |
| Factory 4 | 6:4 | 80.4 |
| Factory 5 | 2:8 | 74.1 |
| Factory 6 | 3:7 | 78.5 |
| Factory 7 | 5:5 | 81.3 |
| Factory 8 | 1:9 | 71.1 |
| Factory 9 | 5:5 | 80.6 |
| Factory 10 | 1:9 | 71.3 |

As can be seen in Table 2 above, it was clearly demonstrated that a recovery rate of $CH_4$ gas in the range of 71% to 83% could be obtained by replacing $CH_4$ gas with a variety of flue gases containing $N_2$ and $CO_2$.

EXAMPLE 4

Determination of Pressure Condition in a Gas Mixture

To determine the pressure condition in a gas mixture, recovery rate of $CH_4$ gas was measured similarly as in Example 1, with the exceptions of using a gas mixture containing $N_2$ and $CO_2$ gases in a molar ratio of 8:2 and reacting for 20 hrs, and subjecting the gas mixture to a pressure of 10 atm, 20 atm, 30 atm, 40 atm, 50 atm, 80 atm, 120 atm, 160 atm or 200 atm, respectively (see: Table 3).

TABLE 3

Changes in recovery rate of $CH_4$ gas depending
on the pressure in gas mixtures

| Pressure of Gas Mixture (atm) | Recovery Rate of $CH_4$ gas (%) |
|---|---|
| 10 | — |
| 20 | — |
| 30 | 83 |
| 40 | 84 |
| 50 | 85 |
| 80 | 84 |
| 120 | 85 |
| 160 | 85 |
| 200 | 85 |

As can be seen in Table 3 above, it was found that $CH_4$ gas in a certain amount could be recovered from natural gas hydrate by subjecting a gas mixture to a pressure of above 30 atm, however replacement of $CH_4$ gas with the gas mixture in natural gas hydrate could not be made since the structure of natural gas hydrate was dissociated under a pressure of 10 to 20 atm.

Accordingly, it was clearly demonstrated that replacement of $CH_4$ gas with a gas mixture could be made efficiently by subjecting the gas mixture in natural gas hydrate to a pressure ranging from 30 to 200 atm.

As clearly described and demonstrated above, the present invention provides a method for recovering methane gas by adding a gas mixture containing $N_2$ and $CO_2$ gases to natural gas hydrate and reacting them. The method for recovering methane gas of the invention assures a recovery rate of $CH_4$ gas much higher than prior art method without dissociating natural gas hydrate layer and utilization of flue gas as an alternative to the gas mixture containing $N_2$ and $CO_2$ gases, which makes possible its practical application for the production of natural gas in terms of economy and environmental protection.

What is claimed is:

1. A method for recovering methane gas from natural gas hydrate which comprises the step of replacing $CH_4$ gas in the natural gas hydrate with a gas mixture containing $N_2$ and $CO_2$ gases in a molar ration of 4:6 to 9:1 by adding the gas mixture to the natural gas hydrate.

2. The method for recovering methane gas from a natural gas hydrate of claim 1, wherein the gas mixture contains $N_2$ and $CO_2$ gases in a molar ratio of 8:2.

3. The method for recovering methane gas from a natural gas hydrate of claim 1, wherein the gas mixture is added to the natural gas hydrate at a temperature of 0 to 5° C. to reach a pressure of 30 to 200 atm and reacted for 9 to 20 hours.

4. A method for recovering methane gas from natural gas hydrate which comprises the step of replacing $CH_4$ gas in the natural gas hydrate with a gas mixture containing $N_2$ and $CO_2$ gases in a molar ration of 4:6 to 9:1 by adding the gas mixture to the natural gas hydrate at a temperature of 0 to 5° C. to reach a pressure of 30 to 200 atm and reacting for 9 to 20 hours.

* * * * *